May 24, 1932.  E. A. CORBIN, JR  1,859,280

BRAKING AND COOLING MECHANISM FOR VEHICLE WHEELS

Filed Feb. 23, 1929  6 Sheets-Sheet 1

INVENTOR.
Elbert A. Corbin Jr.
BY
Herbert S. Fairbanks
ATTORNEY.

May 24, 1932. E. A. CORBIN, JR 1,859,280
BRAKING AND COOLING MECHANISM FOR VEHICLE WHEELS
Filed Feb. 26, 1929 6 Sheets-Sheet 3
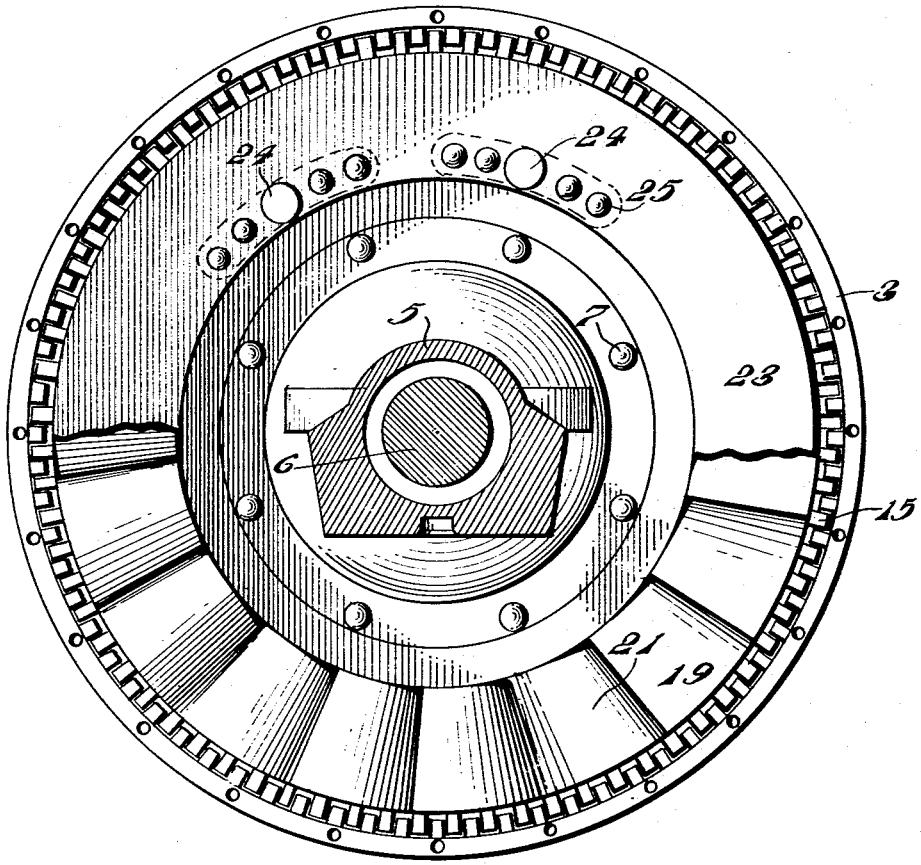
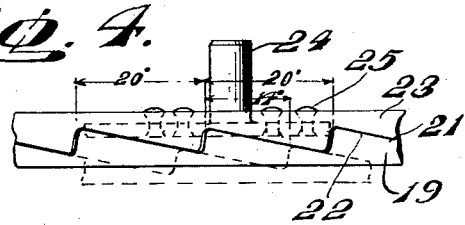
INVENTOR.
Elbert A. Corbin Jr.
BY
Herbert S. Fairbanks
ATTORNEY.

May 24, 1932.  E. A. CORBIN, JR  1,859,280
BRAKING AND COOLING MECHANISM FOR VEHICLE WHEELS
Filed Feb. 26, 1929  6 Sheets-Sheet 4

INVENTOR.
Elbert A. Corbin Jr.
BY
Herbert S. Fairbanks
ATTORNEYS.

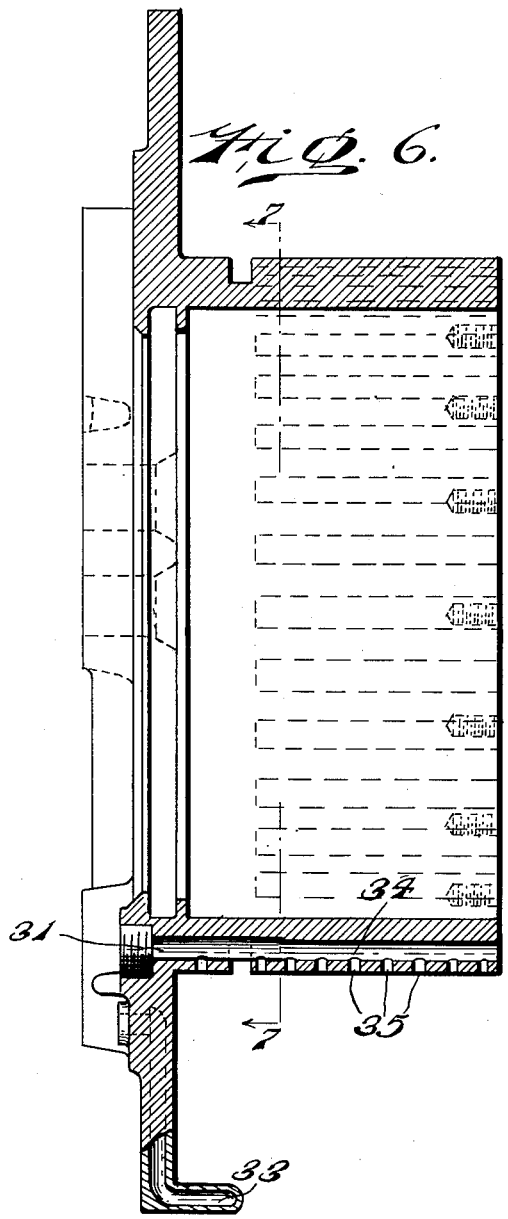

May 24, 1932. E. A. CORBIN, JR 1,859,280
BRAKING AND COOLING MECHANISM FOR VEHICLE WHEELS
Filed Feb. 26, 1929 6 Sheets-Sheet 6

INVENTOR.
Elbert A. Corbin Jr.
BY
Herbert S. Fairbanks
ATTORNEY.

Patented May 24, 1932

1,859,280

UNITED STATES PATENT OFFICE

ELBERT A. CORBIN, JR., OF SWARTHMORE, PENNSYLVANIA

BRAKING AND COOLING MECHANISM FOR VEHICLE WHEELS

Application filed February 26, 1929. Serial No. 342,895.

One serious objection which arises in connection with brakes especially those for automotive vehicles is that the operation of the brake is not uniform throughout its range of operation. Some of the brakes now in use work satisfactorily at the start of the actuation but will release in the middle of the operation and then take hold again at the end of the cycle. This causes considerable noise which is annoying in traffic and is a source of danger to the operator and in all brakes as heretofore employed there has been serious objection in that high specific pressure per square inch is necessary to bring the vehicle to stop.

It is an object of this invention to devise a brake which will be uniform in action throughout the cycle of the operation, which will have low specific pressures and which will be durable and satisfactory throughout the life of the vehicle.

In an internal or external brake of the expanding or contracting brake type the area available within the brake drum is insufficient to hold back the vehicle without high specific pressures and it is an object of this invention to provide the area which will lower the specific pressure.

In the present band brakes employed when adjusted for one atmospheric or weather condition the brakes become either too loose or too tight when another atmospheric or weather condition is met. The condition under which a brake is adjusted is also changed when the brake mechanism heats up due to the heat of operation. It is therefore desirable to have a brake which will not heat up no matter how long it is in use, as occurs in automobiles on a hilly or mountainous country.

In the brakes as used today the brake is used on long hills only in emergency and the engine is utilized as a brake. The disc type of brake on account of its compact construction and the large frictional areas can be used as a basis to overcome the foregoing defect. If a dry disc type of brake is used all of the disadvantages of the expanding or contracting type of brake are present except for the increased area. It is therefore necessary and desirable to lubricate the brake discs and for continuous actuation of the braking mechanism it is necessary to cool this lubricant so that the brake will not rise in temperature throughout its use and thus interfere with the adjustment for which the brake has been set. It is therefore advisable to conduct the lubricant from the brake housing and through a suitable radiator which is subjected to air currents caused by the motion of the vehicle, although, if desired, a fan can be employed to contribute to cool the radiator. In setting the brake mechanism it is desirable to have a progressive action between the friction discs so that a friction disc can cooperate with a juxtaposed friction disc without interfering with the free rotation of the succeeding discs in the stack, and this is preferably accomplished by calibrated springs of progressive capacity between juxtaposed discs. The progression is toward the rear of the stack.

The brake mechanism may be controlled in any desired manner and can be employed both as a service and as an emergency brake and separate controls for such purpose can be used if desired.

With the above and other objects in view, as will hereinafter more clearly appear, my invention comprehends a novel brake mechanism which is especially adapted to be employed in conjunction with automotive vehicles and which is preferably built within a revolving member such as for example, the wheel of an automobile.

It further comprehends novel brake mechanism wherein novel means are employed for setting the brake mechanism and for releasing it, wherein a novel construction and arrangement of brake discs is employed, with novel means between juxtaposed discs, and novel means for maintaining the stack in assembled position.

It further comprehends a novel brake mechanism wherein novel means is provided for effecting the circulation of the lubricant and novel means for effecting the cooling of the lubricant.

It further comprehends a novel construction and arrangement of a housing with novel means for sealing it so that it will form a lubricant containing chamber.

Other novel features of construction and advantage will hereinafter more clearly appear in the detailed description and the appended claims.

For the purpose of illustrating the invention, I have shown in the accompanying drawings typical embodiments of it, which, in practice, will give reliable and satisfactory results. It is, however, to be understood that these embodiments are typical only and that the various instrumentalities of which my invention consists can be variously arranged and organized, and the invention is not limited to the precise arrangement and organization of these instrumentalities as herein set forth.

Figure 3 is a section on line 3—3 of Figure 1, partly broken away.

Figure 4 is an elevation of a portion of certain pressure transmitting members employed.

Figure 5 is an inboard elevation of the assembled device, a portion being shown in section.

Figure 6 is a section on line 6—6 of Figure 7, showing more particularly a stationary housing used in conjunction with rail car wheels.

Figure 9 is a detail of a radiator for cooling the lubricant.

Similar numerals of reference indicate corresponding parts.

Referring to the drawings:—

Figure 1:
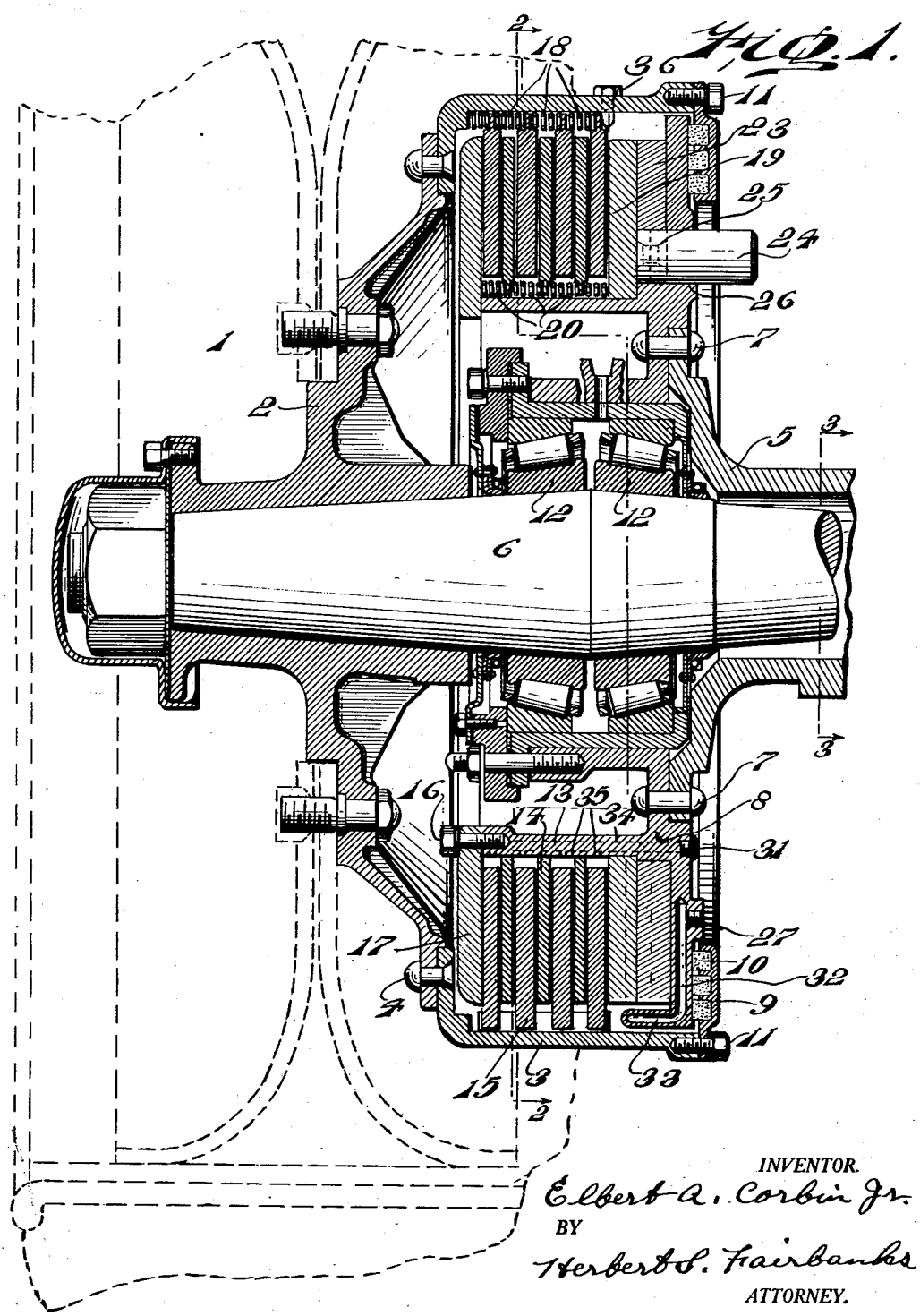
Figure 1 is a sectional elevation of a brake mechanism embodying my invention and shown in assembled relation with respect to a vehicle wheel.
Figure 2:
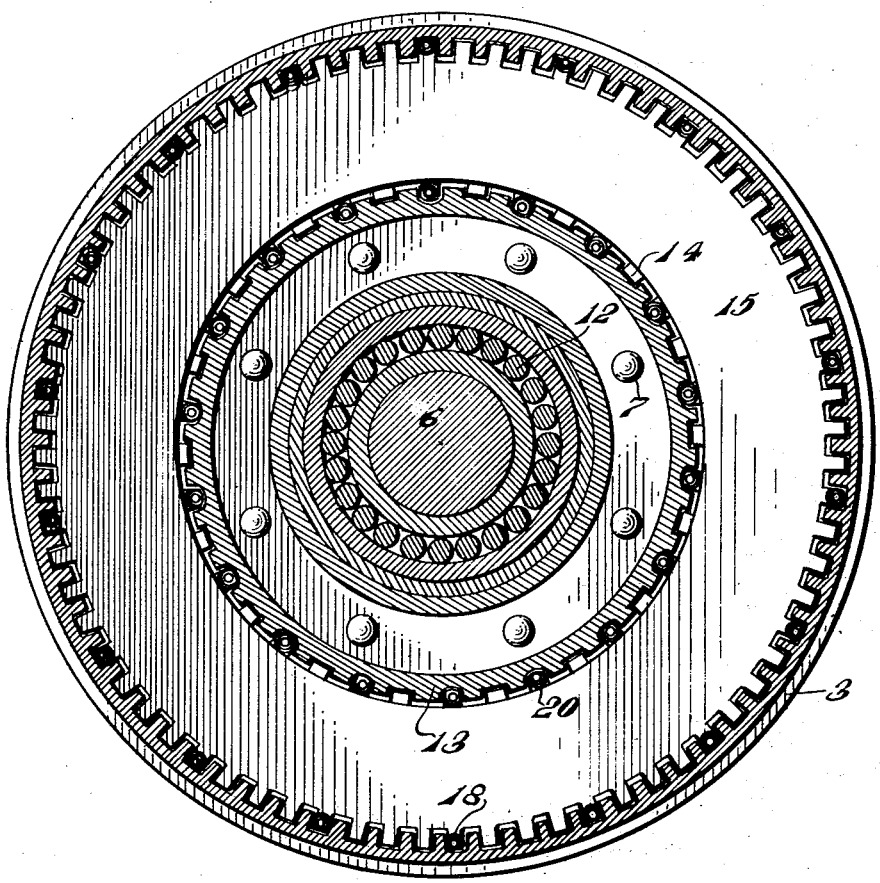
Figure 2 is a section on line 2—2 of Figure 1.

1 designates a vehicle wheel of any desired or conventional type, and, for the purpose of illustration, I have shown a vehicle wheel for a motor vehicle, it being understood that in the broad scope of this invention this brake mechanism can be employed in conjunction with any desired type of automotive vehicle such as, for example, buses, trucks, passenger cars, aeroplanes, boats, trolleys, electric, steam and other propelled railway cars.

The vehicle wheel is provided with a hub 2 to which is connected a brake drum 3 by means of fastening devices 4. The hub carries in any desired or conventional manner the other component parts of the wheel. The hub 2 and the axle housing 5 have mounted in them the axle 6 in any desired or conventional manner. The axle housing 5 has secured to it by means of fastening devices 7, the brake housing 8. This brake housing is sealed with respect to the brake drum 3 by means of a packing cover 9 which carries packing 10 which bears against the side of the brake housing 8 and this packing housing is secured to the brake drum 3 by means of fastening devices 11 in such a manner that it can be removed if desired.

The axle 6 rides in anti-friction bearings 12. The brake housing 8 is provided with a splined inner collar 13 on which are keyed the stationary discs 14 so that they are prevented from rotating but are free to move longitudinally of the collar. The stationary friction discs cooperate with the rotatable friction discs 15 which are splined to the inner face of the brake drum 3 so that they have longitudinal movement on the brake drum relative to the stationary friction discs 14. The collar 13 has secured to it by means of fastening devices 16 an abutment 17 against which one of the rotatable friction discs 15 bears. Between the rotatable discs 15 are interposed calibrated springs 18 of progressive strength in the direction of the abutment 17 so that they increase in strength in accordance with the pressure exerted on the pressure transmitting member 19.

The stationary discs in a similar manner are acted against by springs 20 and these springs are calibrated in a similar manner to the springs 18 so that they progressively increase in capacity towards the abutment 17. The pressure exerting member 19 has its inboard face provided with a series of circumferentially spaced cam surfaces 21, see more particularly Figures 3 and 4. These cam surfaces 21 are mated to and actuated by similar cam faces 22 on a pressure creating member 23 which is interposed between the pressure transmitting member 19 and a circumferential flange on the brake housing 8. The pressure creating member 23 has fixed thereto actuating studs 24 provided with flanges which are secured by rivets 25 to the pressure creating member 23. These studs extend through openings 26 in the brake housing 8 and these openings are circumferentially elongated and their edge is preferably of increased areas in order to strengthen the brake housing at such points.

Figure 7:
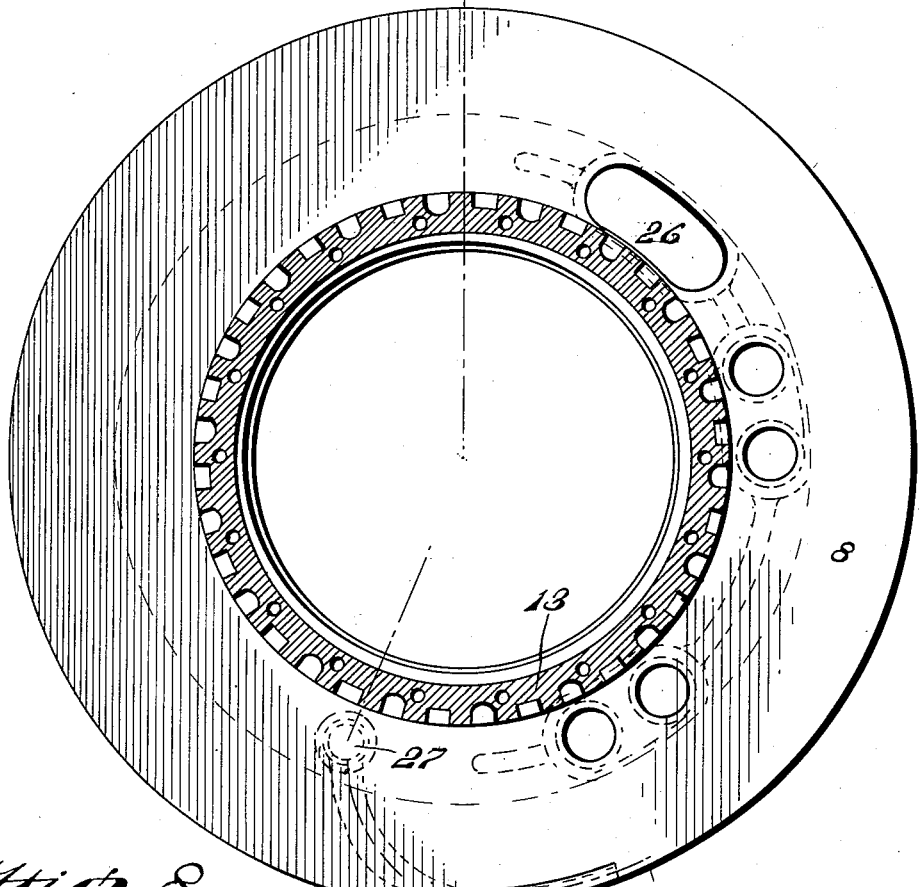
Figure 7 is a section on line 7—7 of Figure 6.
Figure 8:
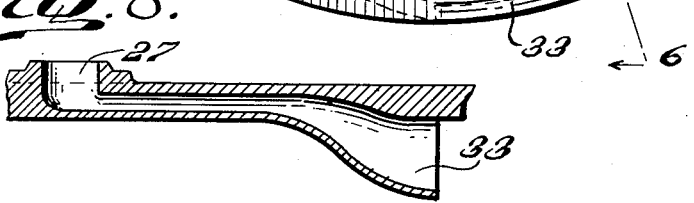
Figure 8 is a detail of the stationary oil pump.

In order to effect the proper lubricating of the friction discs and to insure their life and stability I provided means for forming a forced circulation of the lubricant. For this purpose I have designed a novel construction and arrangement of a stationary impeller which is preferably formed integral with the brake housing 8 and is provided with an outlet 27 which is connected by a flexible hose 28 to a radiator 29 of any desired or conventional construction and which can be supported on the axle or body of the vehicle or at any other desired location. The return of the lubricant from the radiator 29 is by way of the flexible hose 30 which leads to the inlet port 31 in the brake housing. The inlet 27 leads, by means of a passage 32, to the stationary impeller 33 which is shown more in detail in Figures 7 and 8. This is circumferentially elongated to form a curved scoop which lies inwardly of the inner periphery of the brake drum 3 and preferably overlaps the pressure transmitting member 19 and the pressure creating member 23.

The centrifugal force of the rotating brake drum causes the lubricant to pass within reach of this stationary impeller 33 so that the oil will pass, as explained, to the radiator and will return to the opening 31. It will, of course, be understood that in the broad scope of my invention I intend to employ any means for creating the flow of the lubricant and I do not desire to be limited to the construction shown as any type of fluid pump may be employed and still be within the broad scope of this invention.

The inlet opening 31 leads to the passage 34 see Figure 1, which communicates by means of the ports 35. The ports 35 permit the lubricant to pass directly to the friction discs. This construction is seen more clearly in Figure 6 in which the construction is similar to the brake housing 8 shown in Figure 1 except the brake housing is shown as a separate element and is adapted to fit into and be secured to the housing of a conventional rail car wheel.

The operation of the brake mechanism will now be apparent to those skilled in this art and is as follows.

It will be understood that the studs 24 are connected in any desired manner to any desired or conventional type of controlling mechanism so that the brake may be operated either as a service brake or an emergency brake. I have shown in Figure 5 two of these studs so that one may be actuated for the service brake and the other may be actuated for the emergency brake. As such control is well known in the art and does not form per se any part of the present invention, I have deemed it unnecessary to illustrate and describe in detail the brake controlling mechanism. These studs may be actuated mechanically, electrically, hydraulically, or by compressed air to effect the proper setting or release of the braking mechanism.

It will now be clear that if an actuated stud 24 is moved in the direction of the arrow seen in Figure 5 the cooperating cam surfaces 21 and 22 will cause an outboard movement of the pressure transmitting member 19 so that the friction discs will progressively move in an outboard direction. It will be apparent that a movement in the reverse direction of the studs 24 will permit the springs 18 and 20 to effect the complete release of the frictional engagement between the friction discs and will hold them in positively released position against the pressure transmitting member 19 and the set screws 36 which are carried by the brake drum 3. It will thus be seen that the screws 36 form abutments or stops to limit the releasing movement of the rotatable friction discs 15.

Referring now more particularly to the operation of the lubricating means, it will be apparent that the cool lubricant returning from the radiator to the passage 34 will, due to the rotative action, cause the friction members to be coated with a film of oil throughout their areas and this oil is picked up by the stationary impeller 33 and returned to the radiator so that the lubricant is at all times in continuous motion and maintained at a proper temperature to effect the proper lubrication of the moving parts.

It will be apparent that in accordance with this invention the proper braking action can be provided and the actuation of the brake is in such a manner that the gripping action of the frictional discs is progressive and takes place throughout the entire areas of the discs.

It will now be apparent that I have devised a new and useful braking and cooling mechanism for vehicle wheels which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention what I claim as new and desire to secure by Letters Patent, is:—

1. In a brake mechanism for vehicle wheels, the combination with rotatable and stationary friction discs, springs between said stationary discs progressively increasing in capacity, springs between said rotatable friction discs progressively increasing in capacity, of means to progressively bring said discs into frictional gripping engagement.

2. In a brake mechanism for vehicle wheels, the combination with a rotatable part of wheel structure, of friction elements rotatable therewith, a stationary part of the wheel structure, friction elements carried thereby to cooperate with the rotatable friction elements, springs between said elements progressively varying in capacity, in the direction of the setting movement of the brake mechanism, and means to effect a frictional gripping engagement of said friction elements.

3. In a brake mechanism for vehicle wheels, a rotatable part of the wheel structure having an internal chamber, a stationary part of the wheel structure extending into said chamber and having spaced abutments, friction discs keyed to said rotatable part, cooperating friction discs keyed to said stationary part, a pressure transmitting plate between said abutments and between which and one of said abutments the friction discs are disposed, springs between juxtaposed abutments and friction discs and between juxtaposed friction discs said springs progressively increasing in capacity, and means to exert a pressure against said pressure plate to effect the frictional braking engagement of said friction discs.

4. In a brake mechanism for vehicle wheels, a rotatable part of the wheel structure, a stationary part of the wheel structure extending into said chamber, and provided with inboard and outboard abutments, friction discs between said abutments and keyed to said rotatable part, friction discs between said abutments and keyed to said stationary part, resilient means between said discs progressively increasing in capacity and tending to separate said discs, a pressure transmitting member acting against one of said discs, a pressure creating member cooperating with said pressure transmitting member, and means under the control of the operator to adjust the position of said pressure creating member.

5. In a brake mechanism for vehicle wheels, a chambered rotatable part of the wheel structure, a stationary part of the wheel structure extending into said chamber with opposed abutments, friction discs keyed to said rotatable part and disposed between said abutments, friction discs keyed to said stationary part and disposed between said abutments, resilient means between said discs progressively increasing in capacity and tending to separate said discs, a pressure transmitting member cooperating with one of said friction discs, a pressure creating member cooperating with the pressure transmitting member, and means under the control of the operator to adjust the position of said pressure creating member to cause the brake mechanism to act either as a service brake or as an emergency brake.

6. In a brake mechanism for vehicle wheels, a chambered rotatable part of a wheel structure, a stationary part of a wheel structure extending into said chamber, a plate fixed to said rotatable part and overhanging said stationary part and provided with packing to enable said chamber to retain lubricant, said stationary part having inboard and outboard abutments, friction discs keyed to said rotatable part, friction discs keyed to said stationary part, resilient means between said rotatable discs progressively increasing in capacity and between said stationary discs progressively varying in capacity to effect the separation of the friction discs, a pressure transmitting member to effect the frictional engagement of said friction discs, a pressure creating member between one of said abutments and said pressure transmitting member, and means to cause relative movement of said pressure creating and pressure transmitting members to control the frictional braking engagement of said friction discs.

7. In a brake mechanism, a rotatable brake drum, rotatable brake discs splined thereto, a stationary brake housing, an abutment on said brake housing, non-rotatable brake discs splined to said brake housing, calibrated springs between juxtaposed rotatable discs and between juxtaposed non-rotatable discs, and discs having reduced portions contributing to form pockets to receive said springs, and means to effect the setting and release of said brake discs.

ELBERT A. CORBIN, JR.